May 3, 1927. 1,627,246
A. H. McINTYRE
FRUIT GRADING MACHINE
Filed June 29, 1926    3 Sheets-Sheet 1
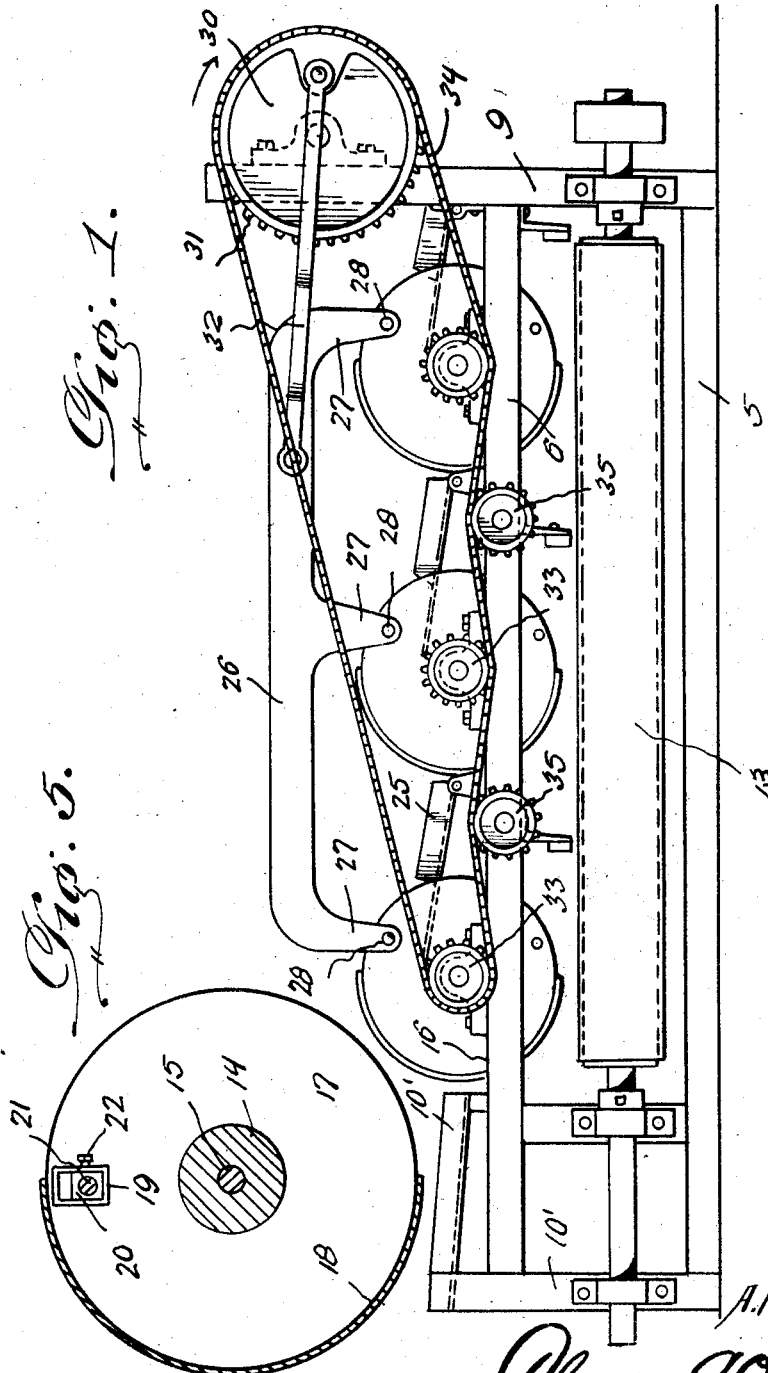
Inventor
A.H. McIntyre,
By Clarence A. O'Brien
Attorney

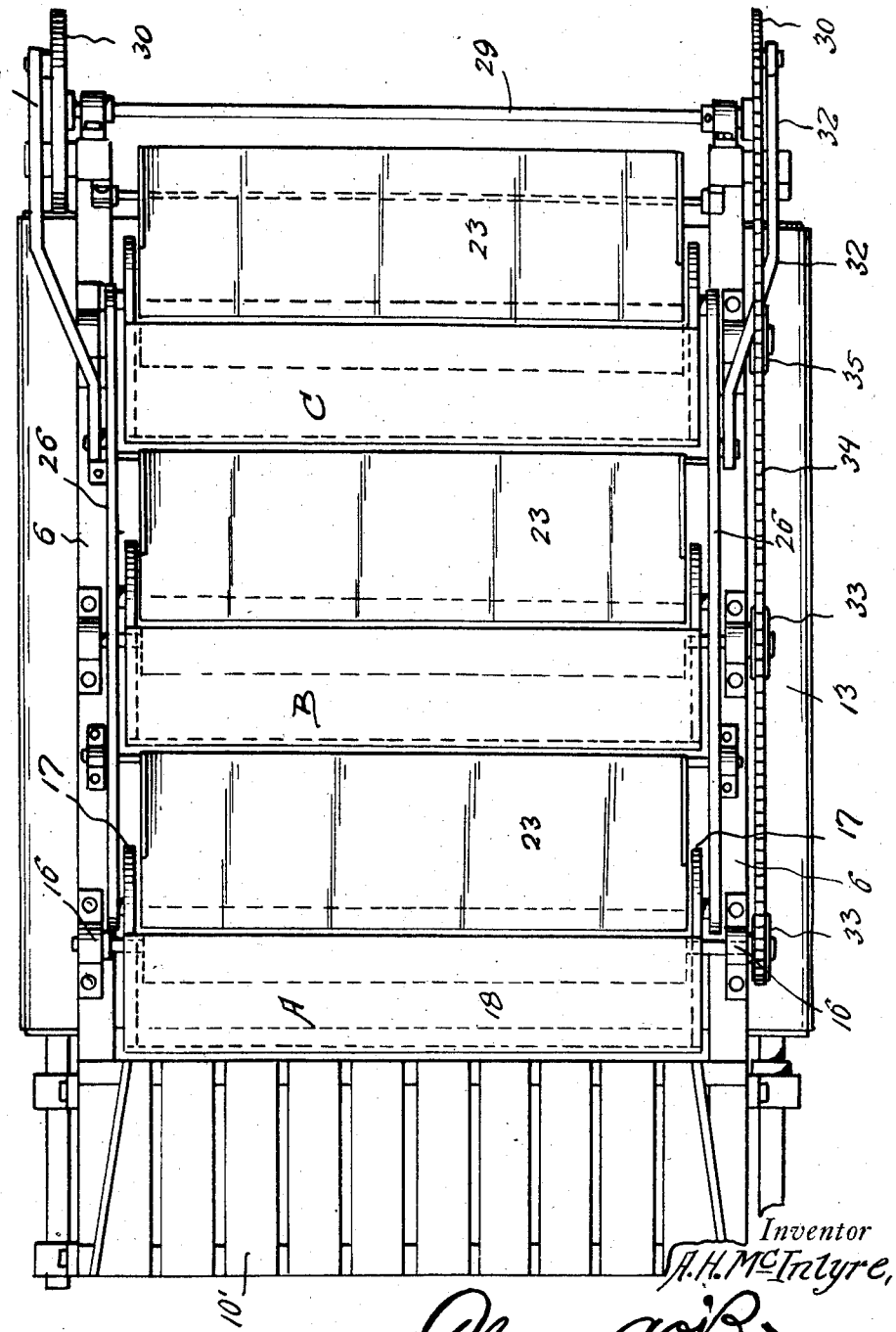

May 3, 1927.
A. H. McINTYRE
1,627,246
FRUIT GRADING MACHINE
Filed June 29, 1926    3 Sheets-Sheet 3
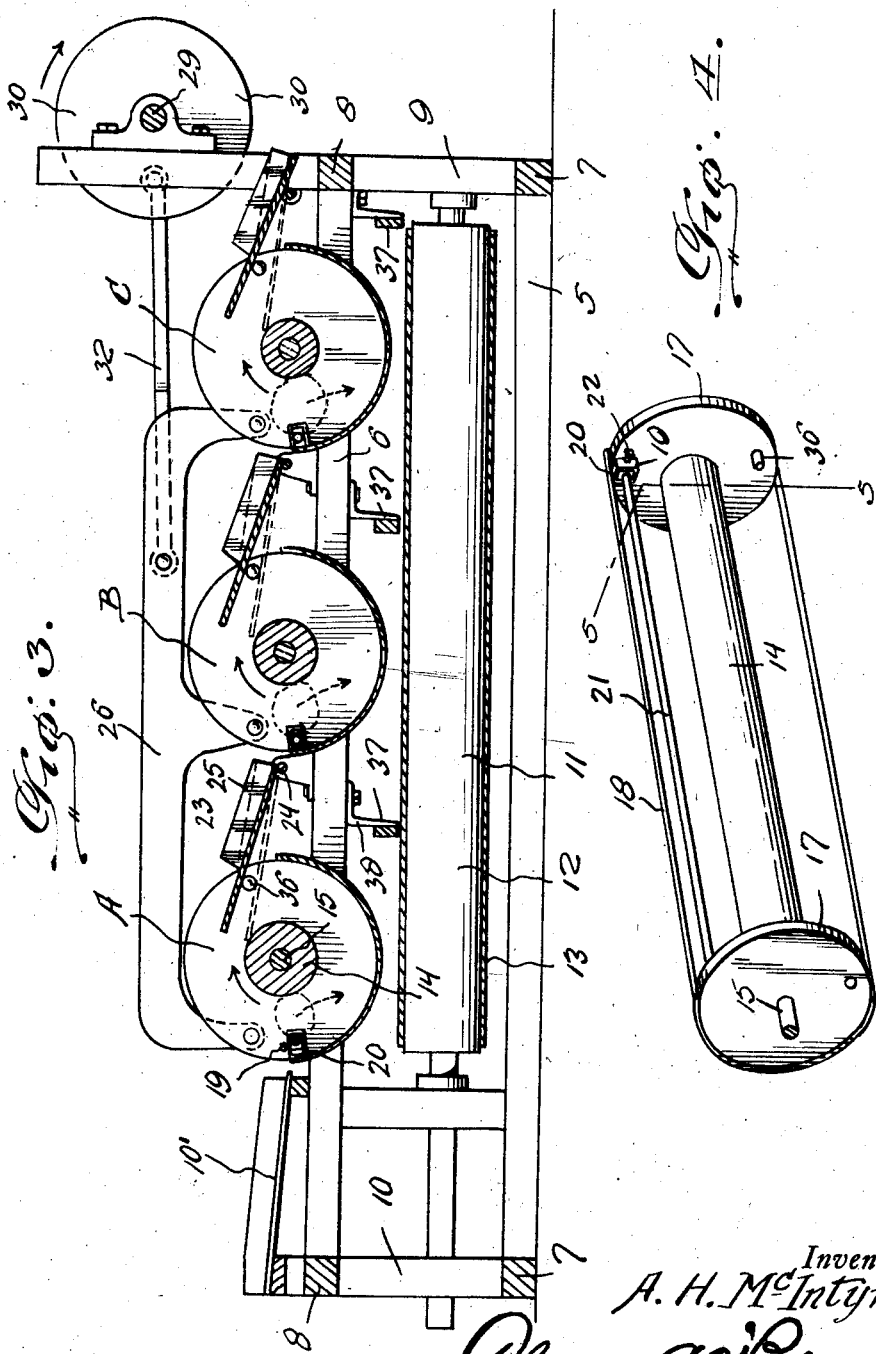
Inventor
A. H. McIntyre,
By Clarence A. O'Brien
Attorney Patented May 3, 1927.

1,627,246

UNITED STATES PATENT OFFICE.

ALLAN H. McINTYRE, OF WINCHESTER, VIRGINIA.

FRUIT-GRADING MACHINE.

Application filed June 29, 1926. Serial No. 119,357.

This invention relates to grading machines for fruits and vegetables and has for its primary object to facilitate the proper and rapid grading of tender fruit such as peaches and the like in such a manner as to overcome the requirement of separating such fruits by hand, this expedient being usually necessary, due to the extreme tenderness of peaches that become so easily bruised as to make it substantially impossible to grade the same by machines now in use.

A further object of the invention is to provide a grading mechanism wherein fruit and vegetables of greatly varying sizes may be properly graded, and this in a simple, efficient and expeditious manner.

A still further object of the invention is to provide a grader wherein the various grading units and conveying mechanism are so related as to enable the fruit to move from one grader unit to the other and onto said conveying mechanism without striking with great force the various elements of the means during the grading operation.

Other objects will become apparent as the nature of the invention is better understood, the same comprising the novel form, combination and arrangement of parts hereinafter more fully described and shown in the accompanying drawings and claimed.

In the drawings wherein like reference characters indicate corresponding parts throughout the several views:—

Figure 1 is a side elevation of a fruit grading machine constructed in accordance with the present invention, Fig. 2 is a top plan view thereof, Fig. 3 is a detail longitudinal section, and Fig. 4 is a perspective of one of the roller and bar grading units, a predetermined number of which are included in the construction of the present mechanism.

Fig. 5 is a detail longitudinal section of one unit of the machine.

Now having particular reference to the drawings, my novel grading machine constitutes the provision of a suitable skeleton frame including a pair of lower spaced horizontal bars 5—5, Figs. 1 and 3, and a pair of upper spaced longitudinal bars 6—6, same figures. The bars 5—5 are interconnected at their opposite ends by cross bars 7—7, while said upper longitudinal bars are also interconnected at their opposite ends by cross bars 8—8, the ends of the adjacent upper and lower bars being interconnected by vertical posts 9—9 and 10—10, the rear end posts 9—9 being of considerably greater length than the bars 10—10 as clearly disclosed in said Figs. 1 and 3.

Mounted upon the forward end of the frame and at the top side thereof is an inclined slatted hopper 11, for the fruit or other material being graded. Extending transversely between the lower and upper frame bars 5—5 and 6—6 respectively, is an endless conveyor unit 11 of suitable construction, preferably consisting of a pair of horizontal side rollers over which travel an endless belt, designated respectively 12 and 13, the shafts of the rollers being suitably journaled within the frame and extending outwardly of the forward end thereof, in order that said conveyor may be properly driven.

Extending transversely across the upper frame bars 6—6 are three grading units designated generally A, B and C. It is of course to be understood that I do not desire to be limited to any specific number of grading units as a greater or lesser number may be provided, as the case demands.

Each grading unit is of identical construction, and a description of one will suffice for all. Only, it is necessary to mention that the transverse rollers 14 of the grading units are of gradually decreasing diameter toward the rear end of the machine, as clearly indicated in Fig. 3.

As just mentioned, each grading unit constitutes the provision of a transverse roller 14 mounted upon a shaft 15, the opposite ends of which are suitably journaled within bearings 16—16 upon the top side of the upper horizontal frame bars 6—6. Loose upon the shaft of the roller directly at the opposite ends of said roller are circular plates 17—17 rigidly attached to the peripheries of which is a semi-circular metallic shield 18, for providing a pocket one-half the circumference of each grading unit when said grading units are in the fruit receiving position disclosed in Fig. 3. At this point, it may be well to state that said plates 18 of the grading units are positioned in identical manner with respect to each other.

Upon the inner faces of the plate 17—17 of each grading unit directly beneath the upper edge of the semi-circular shield 18 are square boxings 19—19 within which are mounted blocks 20—20 upon the opposite ends of a horizontal bar 21, between which and the respective roller 14 the larger fruit will be supported while the smaller fruit will pass therethrough and be caught within the unit pocket provided by reason of the semi-circular metallic shield 18 when the units are in the position disclosed in the longitudinal cross sectional view, Fig. 3. Ordinarily, the variation in the diameter of the rollers 14 of the various grading units will be sufficient to facilitate the proper grading of the fruit. However, a micrometric adjustment may be made by sliding the various bars 21 of the grading units toward or away from their respective rollers, this adjustment being provided by reason of the fact that the blocks 20—20 upon the ends of the bars 21 have some sliding movement in the boxings 19—19 as disclosed in Fig. 3. When the proper adjustment is secured, the blocks are rigidly attached within the boxings by reason of set screws 22.

As disclosed in Figs. 1, 2 and 3, the grading units are in predetermined spaced relation with respect to each other, and with respect to the opposite ends of the frame. Arranged at the rear side of each grading unit is a fruit receiving and discharging chute 23 in the form of a metallic plate of a length substantially equivalent to the distance between the plates 17—17 of each grading unit, the forward edge thereof being arranged between said plates and normally resting upon the complementary roller 14 of the grading unit, as disclosed by the dotted lines in both Figs. 1 and 3.

The opposite edge of each chute is pivotally connected as at 24 in position above the upper frame bar 6—6, the opposite ends of each chute plate being formed with vertical walls 25—25 outwardly of the plates 17—17 of the respective grading units to prevent the fruit from falling off the ends of the chute plate.

Extending horizontally above the grading unit plates 17—17 at opposite sides of the machine, are horizontal arms 26 formed at their opposite ends and at their center with depending fingers 27—27—27 that extend over the outer sides of the plates and pivotally connected thereto as at 28—28—28. The pivotal connections between the said arm fingers and the disks 17—17 of the grading units are at a point just forwardly of the upper edge of the respective semi-circular shield 18.

Extending transversely across the rear end posts 9—9 of the machine frame adjacent the upper end thereof is a horizontal shaft 29 equipped at its opposite ends with disks 30—30 one of which is formed with gear teeth 31, Fig. 1. Eccentrically pivotally connected to the outer sides of these disks are the outer ends of pitman rods 32—32 that are offset inwardly and that are in turn pivotally connected at their inner ends to the arms 26—26. The shaft 29 is equipped with a belt pulley or other suitable means to facilitate the rotation thereof, and it will at once be apparent that when the disks are rotated in the direction of the arrow in Fig. 1, the end plates 17—17 of the grading units, to which are attached the semi-circular shields 18, will be caused to rotate one-quarter revolution from the fruit receiving position disclosed in Fig. 3 to the fruit dumping position disclosed in Fg. 1, and vice versa as indicated by the arrows in Fig. 3.

The ends of the roller shafts 15 at the side of the machine equipped with the toothed disk 30 are equipped with sprocket gears 33 over which are trained the lower flight of an endless chain 34 that is in turn trained over the toothed disk 30 for causing the rotation of the rollers in a continuous clockwise direction during the rotation of the shaft 29. Arranged beneath the lower flight of the sprocket chain between the grading units are idler sprockets 35—35 over which the chain passes for obviously maintaining the same in positive engagement with the sprocket gears of the two rear units.

Obviously, in operation, and assuming the units to be in the position disclosed in the sectional view, Fig. 3, a row of the fruit will drop from the hopper 10 into the first unit A. The smaller fruit will fall between the bar 21 and the roller 14 and be caught in the pocket of the unit provided by the semi-circular shield 18. The larger of the fruit will be supported in a position between the bar and the roller as indicated by the dotted lines in said Fig. 3. The roller 14 of the unit will continuously rotate in the direction of the upper arrow in Fig. 1, for obviously preventing the binding of the fruit between said roller and the stationary bar 21. The rotation of the shaft 29 will cause the pockets of the units to rotate in a clockwise direction to the position disclosed in Fig. 1, at which time the fruit resting between the bar 21 and roller 14 will be caught upon the adjacent chute 25. The pockets will then rotate in a counter-clockwise direction and by reason of laterally inwardly extending pins 36—36 upon the inner sides of the unit disks 17—17 adjacent the lower edge of the respective semi-circular shield 18, the chute will be raised for causing the fruit caught thereon to discharge into the next unit, and so on to the end of the machine, the smaller fruit in every instance falling between the bar 21 and roller 14 of the respective unit to be caught into the pocket thereof and thence delivered onto the conveyor 12 when the pockets of the units are rotated in a clockwise direction to the position disclosed in Fig. 1. It will be obvious that when the pockets of the units are in fruit dumping position, the fruit from the hopper 10 as well as the chutes 23 will be prevented from dropping therefrom, due to the contact of the same against the semicircular shields 18 which are in close proximity to said hopper and to said chutes.

A basket or suitable conveyor may be disposed beneath the chute 23 at the extreme end of the machine for catching the fruit discharging therefrom. It is preferable that the conveyor 12 be operated in a rapid manner in order that the fruit will be conveyed away from the units immediately after the discharging of the fruit therefrom, so that when the next supply of fruit is discharged, a free surface across the entire area of the conveyor will be had. In order to prevent the rolling of the fruit upon the conveyor from beneath one unit to another unit, guide slats 37 are arranged in position above the conveyor at points directly forwardly of each unit A, B and C. These slats being supported by depending brackets 38 secured to the upper horizontal frame bars 6—6.

It will thus be seen that I have provided a highly novel, simple and efficient form of fruit grading machine that is well adapted for all of the purposes heretofore designated, and even though I have herein shown and described this machine consisting of certain details and structural elements, it is nevertheless to be understood that some departures may be had within the spirit and scope of the invention.

Having thus described my invention, what I claim as new is:—

1. In a grading unit for fruit grading machines of the character described, a continuously rotating roller, a pocket arranged partially around said roller but non-rotatably associated therewith, and a gauge bar arranged in spaced relation with the roller and anchored to the pocket at one of its open sides, and means for rotating the pocket with respect to the roller from a generally horizontal position therebeneath, to a position at one side of the roller and vice versa.

2. In a fruit grading machine of the character described, a frame, a plurality of grading units arranged across the frame in predetermined spaced relation, each of said units being of a continuously rotating roller, a pocket arranged partially around said roller but non-rotatably associated therewith, and a gauge bar arranged in spaced parallel relation with the roller and anchored to the pocket at one of its sides, and means for rotating the pocket with respect to the roller from a position beneath the roller to a position adjacent one side of the roller and vice versa.

3. In a fruit grading machine of the class described, a frame, a plurality of grading units arranged across the frame in predetermined spaced relation, each of said units being of a continuously rotating roller, a pocket arranged partially around said roller but non-rotatably associated therewith, and a gauge bar arranged in spaced parallel relation with the roller and anchored to the pocket of one of its sides, means for rotating the pockets with respect to the roller from a position beneath the roller to a position adjacent one side of the roller and vice versa, and means for catching the graded fruit as the same discharges from the pocket when said pocket is moved to the latter mentioned position.

4. In a fruit grading machine of the class described, a frame, a plurality of grading units arranged across the frame in predetermined spaced relation, each of said units being of a continuously rotating roller, a pocket arranged partially around said roller but non-rotatably associated therewith, and a gauge bar arranged in spaced parallel relation with the roller and anchored to the pocket of one of its sides, means for rotating the pockets with respect to the roller from a position beneath the roller to a position adjacent one side of the roller and vice versa, means for catching the graded fruit as the same discharges from the pocket when said pocket is moved to the latter mentioned position, means for conveying the ungraded fruit from one unit to the other unit.

5. In a fruit grading machine of the class described, a frame, a plurality of grading units arranged across the frame in predetermined spaced relation, each of said units being of a continuously rotating roller, a pocket arranged partially around said roller but non-rotatably associated therewith, and a gauge bar arranged in spaced parallel relation with the roller and anchored to the pocket of one of its sides, means for rotating the pockets with respect to the roller from a position beneath the roller to a position adjacent one side of the roller and vice versa, and means for catching the graded fruit as the same discharges from the pocket when said pocket is moved to the latter mentioned position, and a pivotal chute arranged between the units upon which the ungraded fruit will be projected and automatic means for delivering the fruit from the chute into the next unit of the pockets of the units are moved to fruit receiving position.

6. In a fruit grading machine of the character described, a frame, a plurality of grading units arranged across the frame in predetermined spaced relation, each of said units consisting of a continuously rotating roller, a pocket arranged partially around said roller but not rotatably associated therewith, and an adjustable gauge bar arranged in predetermined spaced parallel relation with the roller and anchored to the pocket at one of its sides, means for continuously rotating the rollers of the units, and means for rotating the pockets of the unit from a position beneath the respective rollers to a position at one side of the respective rollers, and vice versa, and means for so actuating the rollers, and pockets of the units simultaneously.

7. In a fruit grading machine of the character described, a frame, a plurality of grading units arranged across the frame in predetermined spaced relation, each of said units consisting of a continuously rotating roller, a pocket arranged partially around said roller but not rotatably associated therewith, an adjustable gauge bar arranged in predetermined spaced parallel relation with the roller and anchored to the pocket at one of its sides, means for continuously rotating the rollers of the units, means for rotating the pockets of the unit from a position beneath the respective rollers to a position at one side of the respective rollers, and vice versa, means for so actuating the rollers and pockets of the units simultaneously, and automatically operable means for delivering the ungraded fruits from one unit to the other when the pockets of the units are in fruit receiving position.

8. In a fruit grading machine of the character described, a frame, a plurality of grading units arranged across the frame in predetermined spaced relation, each of said units consisting of a continuously rotating roller, a pocket arranged partially around said roller but not rotatably associated therewith, an adjustable gauge bar arranged in predetermined spaced parallel relation with the roller and anchored to the pocket at one of its sides, means for continuously rotating the rollers of the units, means for rotating the pockets of the unit from a position beneath the respective rollers to a position at one side of the respective rollers, and vice versa, means for so actuating the rollers and pockets of the units simultaneously, automatically operable means for delivering the ungraded fruits from one unit to the other when the pockets of the units are in fruit receiving position, and means for conveying the graded fruit dropped from the pocket of the unit and in their last mentioned position outwardly of the machine frame.

9. In a fruit grading machine of the character described, a frame, a plurality of grading units arranged across the frame in predetermined spaced relation, each of said units consisting of a continuously rotating roller, the rollers of the various units being of gradually decreasing diameter towards the rear end of the machine, a pocket arranged partially around said roller but nonrotatably associated with the same, and a gauge bar arranged in spaced parallel relation with the roller and anchored to the pocket of one of its open sides, means for continuously rotating the rollers and means for rotating the pockets of the units from a position beneath the rollers to a position at one side of the frame and vice versa.

In testimony whereof I affix my signature.

ALLAN H. McINTYRE.